US009007889B2

United States Patent
Kanda et al.

(10) Patent No.: US 9,007,889 B2
(45) Date of Patent: Apr. 14, 2015

(54) COMMUNICATION DEVICE AND COMMUNICATION SYSTEM WITH FAILURE DETECTION CAPABILITIES

(75) Inventors: Mitsuru Kanda, Tokyo (JP); Yasuyuki Kozakai, Kanagawa-ken (JP); Kenichi Taniuchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 163 days.

(21) Appl. No.: 13/420,172

(22) Filed: Mar. 14, 2012

(65) Prior Publication Data

US 2012/0207029 A1    Aug. 16, 2012

Related U.S. Application Data

(63) Continuation of application No. PCT/JP2009/006723, filed on Dec. 9, 2009.

(51) Int. Cl.
| | | |
|---|---|---|
| H04J 1/16 | (2006.01) | |
| H04L 12/26 | (2006.01) | |
| H04L 29/06 | (2006.01) | |
| H04L 12/28 | (2006.01) | |
| H04J 3/06 | (2006.01) | |
| H04J 3/14 | (2006.01) | |

(52) U.S. Cl.
CPC ............ *H04L 43/10* (2013.01); *H04L 43/0805* (2013.01); *H04L 69/28* (2013.01); *H04J 3/0667* (2013.01); *H04J 3/14* (2013.01)

(58) Field of Classification Search
USPC .......................................... 370/252, 503, 216
See application file for complete search history.

(56) References Cited

U.S. PATENT DOCUMENTS

| 7,237,152 B2* | 6/2007 | Chiu et al. ...................... 714/56 |
| 7,266,758 B2 | 9/2007 | Takeuchi et al. |
| 7,890,616 B2* | 2/2011 | Wahl .............................. 709/223 |
| 7,990,847 B1* | 8/2011 | Leroy et al. ................... 370/216 |
| 2002/0111162 A1* | 8/2002 | Wendisch ...................... 455/423 |
| 2005/0102586 A1* | 5/2005 | Chiu et al. ...................... 714/56 |
| 2005/0144505 A1 | 6/2005 | Takeuchi et al. |
| 2010/0223317 A1* | 9/2010 | Carlson et al. ................ 709/201 |

FOREIGN PATENT DOCUMENTS

| JP | 2003-204329 | 7/2003 |
| JP | 2003-298587 | 10/2003 |

(Continued)

OTHER PUBLICATIONS

International Preliminary Report for PCT/JP2009/006723 mailed Jul. 10, 2012.

(Continued)

*Primary Examiner* — John Pezzlo
(74) *Attorney, Agent, or Firm* — Amin, Turocy & Watson, LLP

(57) ABSTRACT

Provided are a communication device and a communication system capable of specifying a failure part in a network in which a time server and a communication path are made redundant.
A communication device acquires time-related information from a plurality of time servers over a plurality of networks and compares the information to specify the failure part in the time servers or in the networks. A remote apparatus acquires time-related information from the communication device over the plurality of networks and compares the information to determine the failure of the communication device.

8 Claims, 16 Drawing Sheets

(56) References Cited

FOREIGN PATENT DOCUMENTS

| | | |
|---|---|---|
| JP | 2005-167347 | 6/2005 |
| JP | 2006-253750 | 9/2006 |
| JP | 2008-079008 | 4/2008 |
| JP | 2008-193482 | 8/2008 |

OTHER PUBLICATIONS

Meier et al, IEEE 1588 Applied in the Environment of High Availability LANs, pp. 100-104, Proceedings on IEEE ISPCS 2007.

International Search report for PCT/JP2009/006723 mailed Mar. 2, 2010.

* cited by examiner

FIG. 2

| Time server | Network | Time error | Error in clock rate (error per second) | Communication possibility |
|---|---|---|---|---|
| Time server 101 | Network103 | 100[ns] | 234[ns] | True |
| Time server 101 | Network104 | 23[ns] | 133[ns] | True |
| Time server 102 | Network103 | 74[ns] | 212[ns] | True |
| Time server 102 | Network104 | N/A | N/A | False |

FIG. 7

| | |
|---|---|
| Condition 1 | Difference between clock information (time server 101, network 103) and clock information (time server 101, network 104) is small, difference between clock information (time server 102, network 103) and clock information (time server 102, network 104) is small, difference between clock information (*, network 103) and clock information (time server 102, *) is large |
| Condition 2 | Value of clock information of only one given pair of network and time server is far different from values of clock information of other pairs |
| Condition 3 | Difference between clock information (time server 101, network 103) and clock information (time server 102, network 103) is small, difference between clock information (time server 101, network 104) and clock information (time server 102, network 104) is small, and difference between clock information (*, network 103) and clock information (*, network 104) is large |
| Condition 4 | Difference between clock information (time server 101, network 103) and clock information (time server 101, network 104) is small, difference between the clock information (time server 102, network 103) and clock information (time server 102, network 104) is large, and difference between clock information (time server 101, *) and clock information (time server 102, *) is large |
| Condition 5 | Difference between clock information (time server 101, network 103) and clock information (time server 101, network 104) is large, difference between clock information (time server 102, network 103) and clock information (time server 102, network 104) is small, and difference between clock information (time server 101, *) and clock information (time server 102, *) is large |
| Condition 6 | Difference between clock information (time server 101, network 103) and clock information (time server 102, network 103) is small, difference between clock information (time server 101, network 104) and clock information (time server 102, network 104) is large, and difference between clock information (*, network 103) and clock information (*, network 104) is large |
| Condition 7 | Difference between clock information (time server 101, network 103) and clock information (time server 102, network 103) is large, difference between clock information (time server 101, network 104) and clock information (time server 102, network 104) is small, and difference between clock information (*, network 103) and clock information (*, network 104) is large |
| Condition 8 | None of conditions 1 to 7 are satisfied and difference in clock information is large between two sets of pair of time server and network |

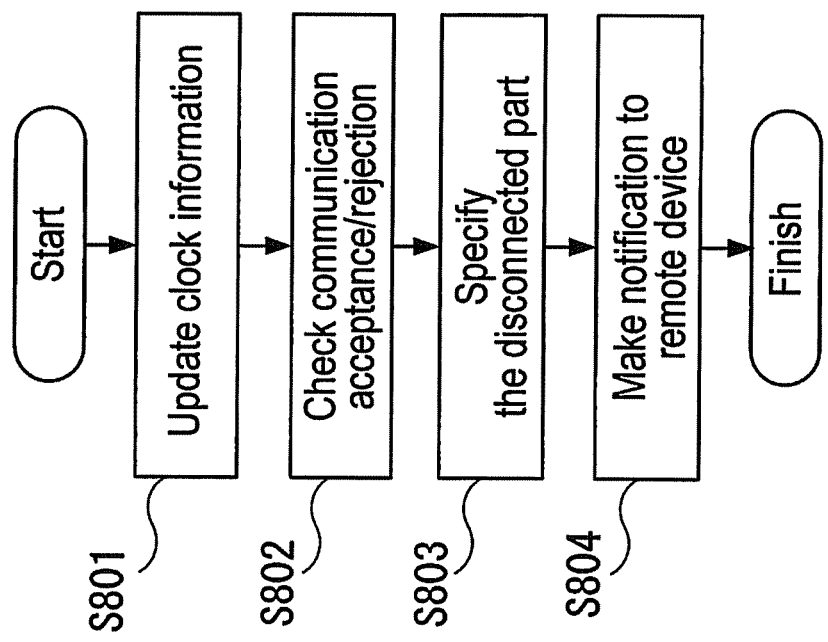

FIG. 10

| Condition1 | Only communication possibility (time server A, network A) is false |
| --- | --- |
| Condition2 | Only communication possibility ( * , network A) is false |
| Condition3 | Only communication possibility (time server A, * ) is false |

FIG. 13

| Identifier of communication device | Network | Measurement time | Measurement value |
|---|---|---|---|
| 10 | Network 103 | 2009.10.10 12:00:05 | 1000 |
| 10 | Network 104 | 2009.10.10 12:00:04 | 900 |
| 20 | Network 103 | 2009.10.10 12:00:04 | 1003 |
| 20 | Network 104 | 2009.10.10 12:00:05 | 1005 |

COMMUNICATION DEVICE AND COMMUNICATION SYSTEM WITH FAILURE DETECTION CAPABILITIES

CROSS-REFERENCE TO RELATED APPLICATION

This application is a continuation of International Application No. PCT/JP2009/006723 filed on Dec. 9, 2009, the entire contents of which are incorporated herein by reference.

FIELD

Embodiments described herein relate generally to a communication device connected to a network with redundancy and a communication system.

BACKGROUND

There is known a communication system in which two time servers are connected respectively to two networks and a communication device is connected to both the networks (see, e.g., NPL 1).

In NPL 1, Grandmaster is a time server, and Ordinary clock is the communication device. The communication device synchronizes in time with a main time server and switches over to a sub time server when being in an incommunicable state with the main time server. The redundancy of both the communication path and time server increases the reliability of a time synchronization system.

However, in general, a device, a method, and a program for specifying a failure part have not been established. An administrator cannot grasp the abnormal part before restoration. Therefore, a replacement cannot be prepared until he or she specifies the abnormal part at the installation site of a communication system, making restoration work inefficient.

Conventional techniques have a problem that it is not possible to specify the abnormal part.

BRIEF DESCRIPTION OF THE DRAWINGS

FIG. 2 is a view illustrating an example of clock information.

FIG. 7 is a table representing branch conditions 1 to 8 of the failure detection described in FIG. 6.

FIG. 8 is a flowchart illustrating a processing flow to detect the disconnected part, performed by the communication device according to the first embodiment.

FIG. 10 is a view illustrating conditions 1 to 3 of the disconnected part in the flowchart of FIG. 9.

FIG. 13 is a view representing an example of measurement data in the second embodiment.

DETAILED DESCRIPTION

According to one embodiment, a communication device includes: a plurality of interfaces connecting to a plurality of time servers and a remote device over a plurality of networks as communication paths; a time synchronization unit that specifies a failure part on the network and generates a failureity notifying message describing a range within which a failure has occurred; and a network processing unit that performs protocol processing between itself and time server through the interface so as to transmit/receive a communication message, performs protocol processing for the error message generated in the time synchronization unit and transmits the resultant message to the remote device. The time synchronization unit calculates, for each combination of the time server and communication paths, clock information based on information described in the communication message and reception time thereof and specifies the abnormal part on the network based on the calculated clock information.

First Embodiment

Figure 1:
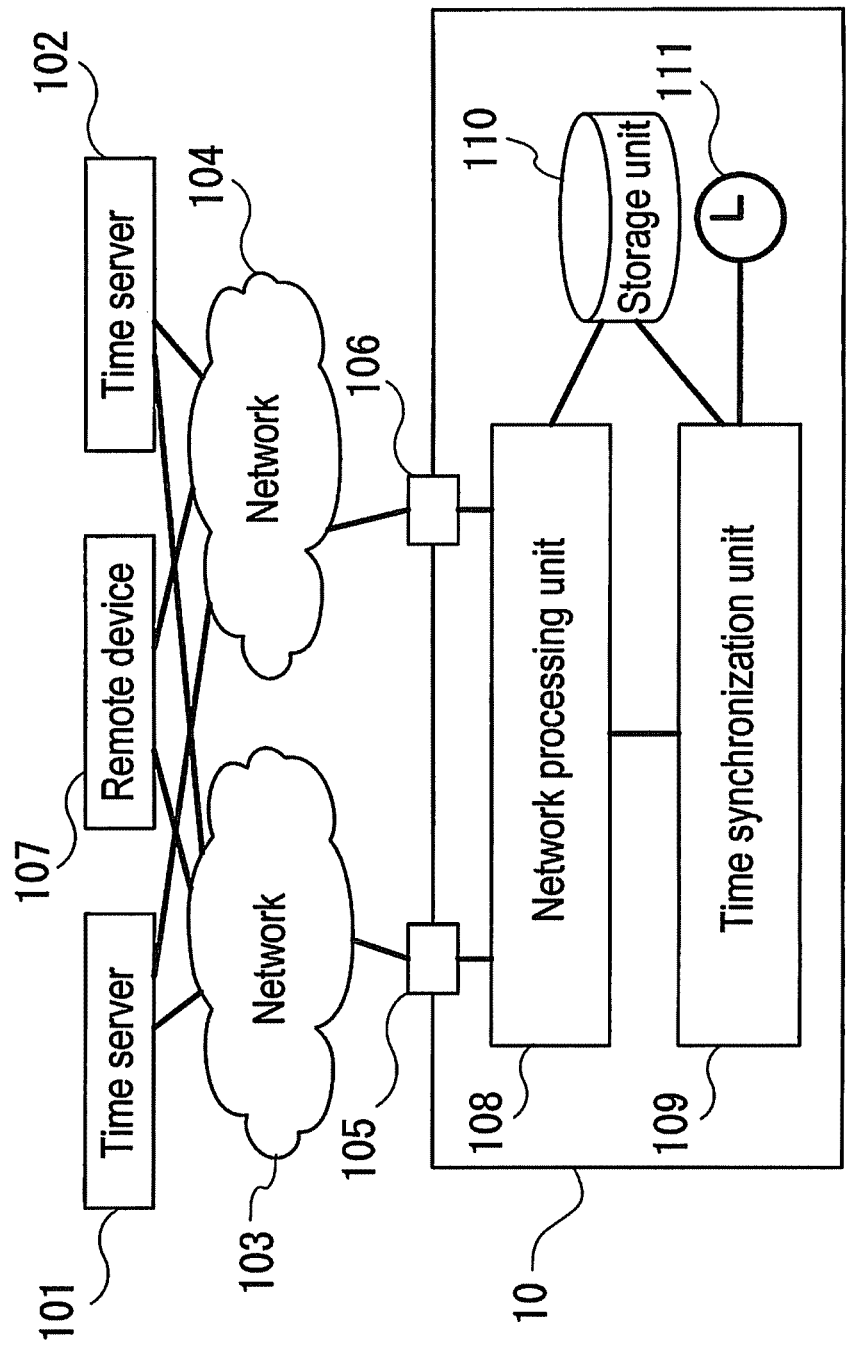
FIG. 1 is a view illustrating configurations of a communication device and a communication system according to a first embodiment.

FIG. 1 is a view illustrating a communication system according to a first embodiment. The communication system roughly includes a communication device 10, two time servers 101, 102, two networks 103, 104, and a remote device 107. The communication device 10 includes, as components for transmitting/receiving signals with external devices, two interfaces 105, 106, a network processing unit 108, a time synchronization unit 109, a storage unit 110, and a clock 111.

The communication device 10 is connected to the network 103 through the interface 105 and to the network 104 through the interface 106. The time server 101, time server 102, and remote device 107 are each provided with a plurality of interfaces and each connected to both the network 103 and network 104.

The communication device 10 acquires information (hereinafter, referred to as "clock information") concerning time from the time server 101 and time server 102 through a plurality of communication paths. The clock information indicates, e.g., a time error between the time server 101 and communication device 10 or a time error between time server 102 and communication device 10. Alternatively, the clock information indicates a clock skew (difference in clock rate) between the time server 101 and communication device 10 or clock skew between time server 102 and communication device 10. Further alternatively, the clock information indicates whether the communication device 10 can communicate with either of time servers where the specific communication path is used for the communication.

The communication device 10 compares four pairs of clock information (to be described later) acquired from the time server 101 and time server 102 over the network 103 and network 104 to specify a failure part. Specifically, the communication device 10 specifies in which one of the following parts a failure has occurred: timeserver 101, time server 102, network 101, and network 102.

Each of the interface 105 and interface 106 is a communication interface supporting communication schemes such as Ethernet®, power line protocol, Zigbee, CDMA (Code Division Multiple Access), WiMAX (Worldwide Interoperability for Micorwave Access), LTE (Long Term Evolution), or CAN (Controller Area Network).

The network processing unit 108 performs processing based on a protocol such as Ethernet®, IPv4 (Internet Protocol Version 4), IPv6 (Internet Protocol Version 6), Profinet®, or CAN. Further, the network processing unit 108 performs processing based on a time synchronization protocol such as IEEE1588 or NTP (Network Time Protocol) and transmits/receives a communication message of the time synchronization protocol through the interface 105 or interface 106.

The time synchronization unit 109 is connected to the network processing unit 108, calculates the time error or the clock skew based on information described in the communication message transmitted/received through the network processing unit 108, and adjusts the time or clock rate of the clock 111. Further, the time synchronization unit 109 calculates the clock information and specifies the failure part of the communication system based on the clock information. For example, when the clock information indicates the time error or clock skew, the time synchronization unit 109 calculates the clock information based on the communication message of the time synchronization protocol. Alternatively, when the clock information indicates whether the communication device 10 can communicate with either of time servers, the time synchronization unit 109 determines the communication possibility based on whether the message of the time synchronization protocol can be received within a given set time or based on whether a reply message can be received in response to a communication message such as ICMP Echo Request. The time synchronization unit 109 notifies the remote device 107 of the specified failure part through the network processing unit 108 and either of interface 105 or interface 106.

The storage unit 110 holds information required for the operation of the time synchronization protocol that the network processing unit 108 conforms to and stores the clock information output from the time synchronization unit 109.

FIG. 2 illustrates an example of the clock information stored in the storage unit 110. The storage unit 110 stores the clock information for each pair of the time server and network used for the measurement of the clock information. In the example of FIG. 2, the storage unit 110 holds the time error, clock skew (error in clock rate), and communication capability as the clock information. For example, it is seen that communication can be made between the time server 101 and network 104 and that a time error of 23 ns and a clock skew of 133 ns are generated.

The clock 111 can be realized by an oscillator. The clock 111 may be an oscillator that changes its frequency according to input voltage or may be a clock implemented as Adder Based Clock.

The time server 101 and time server 102 are each a server that provides the clock information to the communication device 10 over the network 103 or network 104. The time servers 101 and 102 support a protocol that synchronizes a clock provided in a device with correct time and operates as e.g., Master or NTP server of IEEE1588.

The remote device 107 receives the notification concerning the failure part from the communication device 10 and notifies an administrator of the communication system of the failure part. The remote device 107 may notify a remotely located device of the failure part over a different network from the network 103 and network 104.

Figure 3:
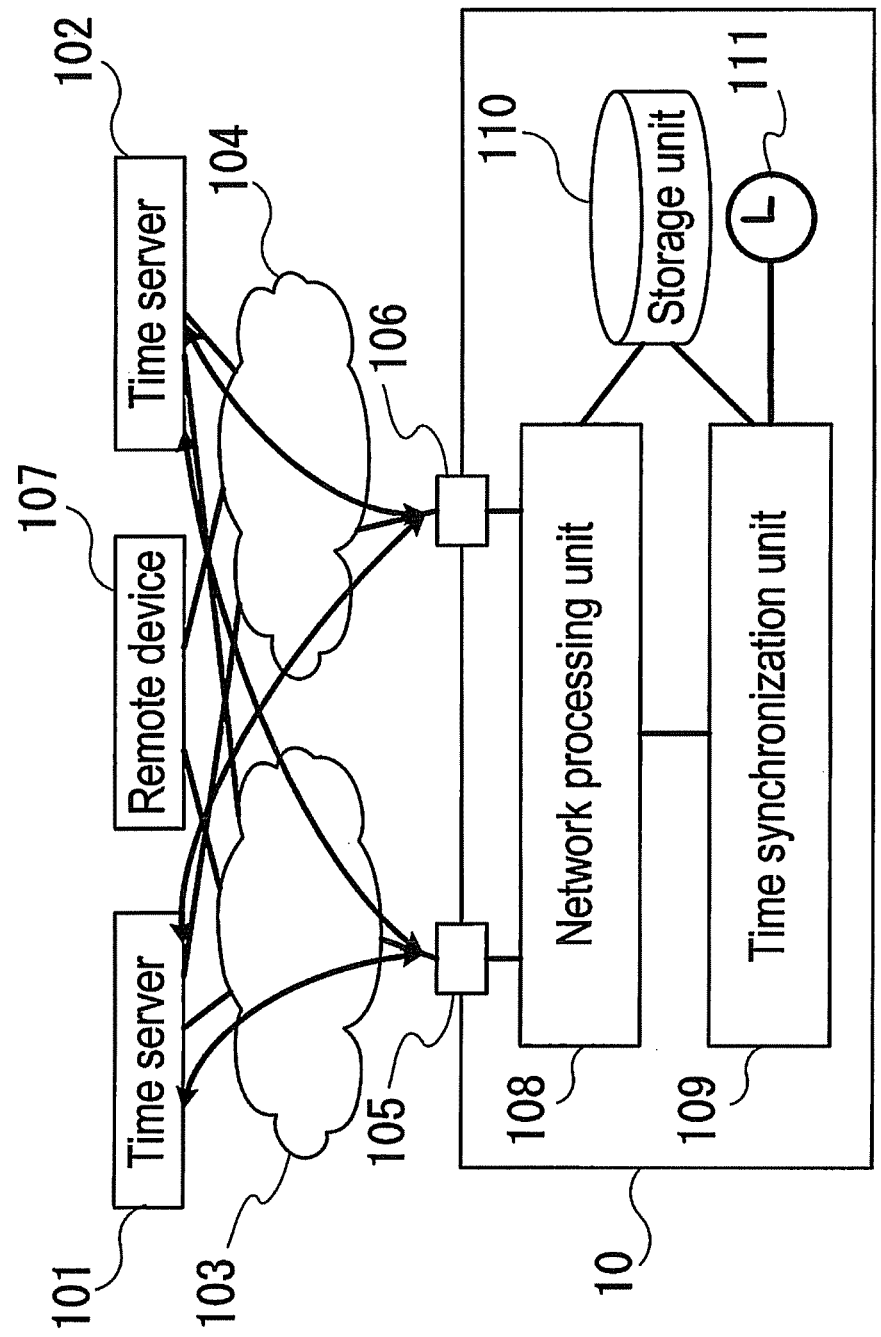
FIG. 3 is a view illustrating communication paths in the communication system according to the first embodiment.

The following describes an operation of the communication system and communication device according to the present embodiment. FIG. 3 illustrates communication paths between the communication device 10 and time server 101 and between the communication device 10 and time server 102. The communication device 10 performs communication using the time synchronization protocol over the two networks and four communication paths connected to the two time servers to acquire the four pairs of clock information.

Figure 4:
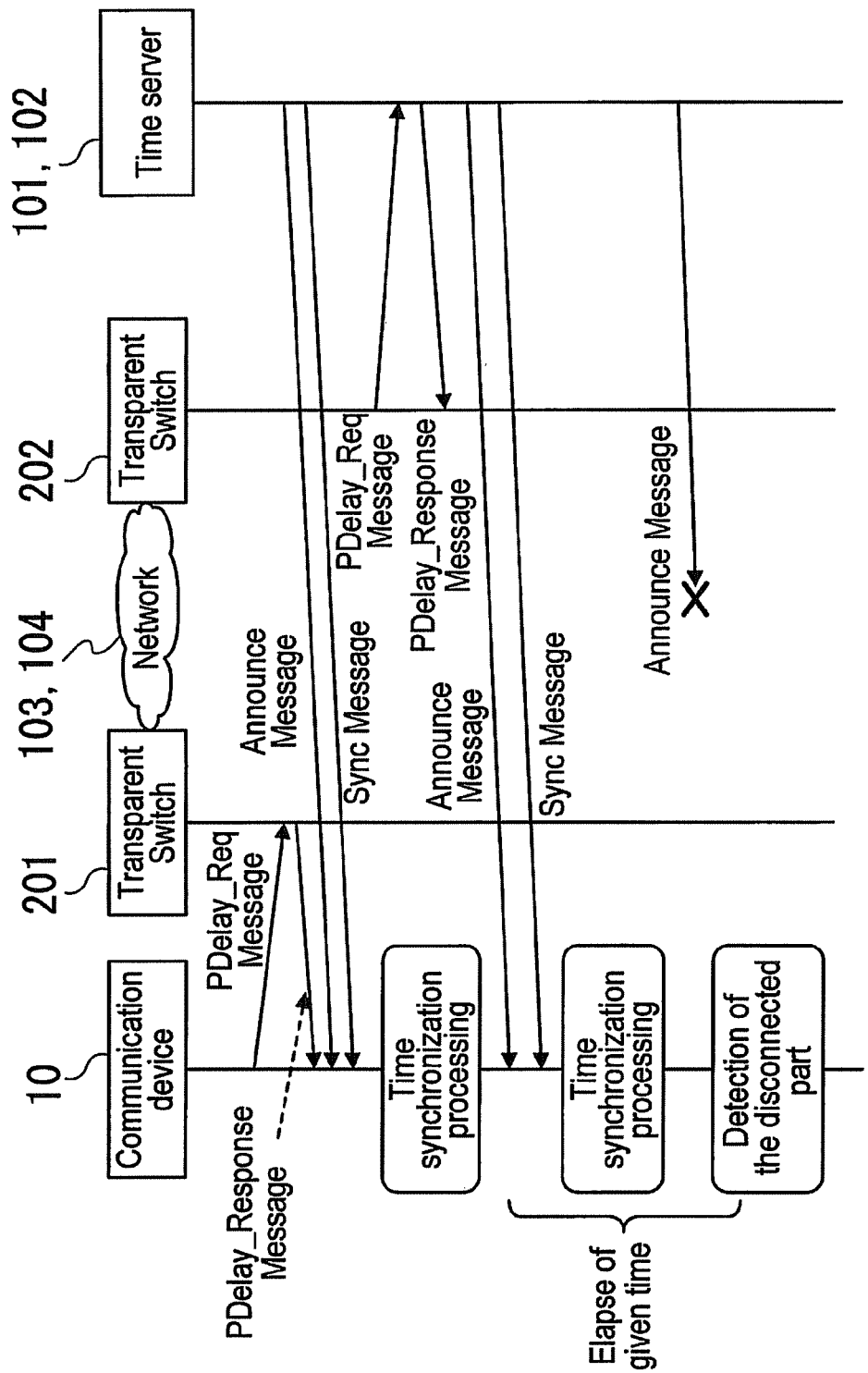
FIG. 4 is a sequence diagram illustrating an operation of the communication system according to the first embodiment.

FIG. 4 is a time synchronization sequence diagram in the communication system according to the present embodiment. FIG. 4 illustrates behavior that the communication device 10, time server 101, and time server 102 perform time synchronization among them using IEEE1588. Transparent switch 201 and Transparent switch 202 are Ethernet® switches installed in the networks 103 and 104, respectively.

The communication device 10, time server 101, and time server 102 use a PDelay_Req message and a PDelay_Response message to periodically measure a communication delay between adjacent devices (e.g., Transparent switch 202 and time server 101). The time server 101 and time server 102 use Alternate master option which is an optional feature of IEEE1588 to periodically transmit a Sync message and an Announce message to the communication device 10. The Sync message contains a time stamp indicating the time at which it is transmitted. The Announce message contains attribute information concerning the time server. In place of appending the time stamp indicating the time at which the Sync message is transmitted, the time server 101 and time server 102 may transmit, immediately after transmitting the Sync message, a Follow_Up message containing the time stamp indicating the time at which the Sync message is transmitted.

In the case where the communication device 10 does not receive the Announce message from the time server 101 or time server 102 within a given set time, the communication device 10 specifies a disconnected part. Details of the processing to specify the disconnected part will be described later.

When the communication device 10 receives the Sync message, the network processing unit 108 of the communication device 10 stores the receipt time of a Sync message in the storage unit 110. Further, the network processing unit 108 performs processing based on Ethernet® and IEEE1588. The time synchronization unit 109 uses a Sync message transmission time described in the Sync message, the accumulated communication delays described in the Sync message, and a time at which the communication device 10 has received the Sync message to calculate the time error with the time server that has transmitted the Sync message to perform time synchronization. Details of the time synchronization will be described later.

The communication device 10, time server 101, and time server 102 may use Network Time Protocol (NTP) in place of IEEE1588. Regardless of which one of the time synchronization protocols the network processing unit 108 utilizes, the communication device 10 performs one or both of the time synchronization and specifying disconnected part.

Figure 5:
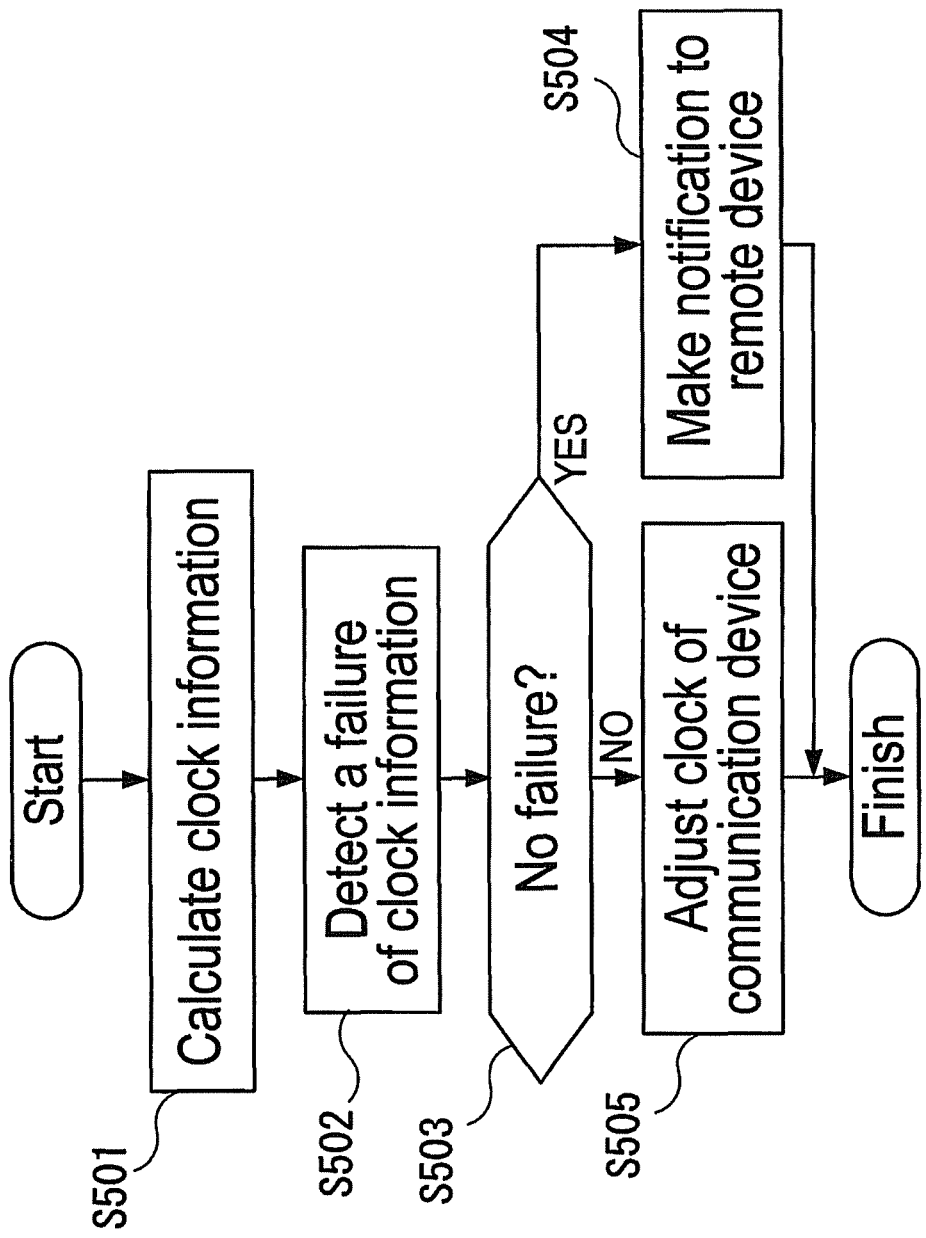
FIG. 5 is a flowchart of time synchronization performed by the communication device according to the first embodiment.

FIG. 5 illustrates a flowchart of the time synchronization performed by the communication device 10. The time synchronization unit 109 calculates the clock information (step S501). That is, the time synchronization unit 109 uses the information described in the communication message exchanged with each of the time servers 101 and 102 to calculate the time error between the time server 101 and the communication device and time error between the time server 102 and communication device 10. The time synchronization unit 109 then stores the calculated time errors in the storage unit 110. In the case where the time error concerning the same pair of the time server and network has already been stored in the storage unit 110, the time error is subjected to overwrite.

The clock information calculated by the time synchronization unit 109 is not limited to the time error but may be a clock rate between the time server 101 and communication device 10 and clock rate between the time server 102 and communication device 10.

The time synchronization unit 109 then performs failure detection of the clock information (step S502). Details of the failure detection of the clock information will be described later.

Subsequently, the presence/absence of a failure is determined according to a result of the failure detection (step S503). When determining that the failure is present, the time synchronization unit 109 generates a message (hereinafter, referred to as "error message") describing a range within which the failure has occurred and outputs the error message to the network processing unit 108. The network processing unit 108 performs Ethernet® protocol processing for the error message and notifies the remote device 107 of the resultant error message (step S504). The remote device 107 then notifies the administrator of the communication system of the failure.

On the other hand, when determining that the failure is absent, the time synchronization unit 109 uses the clock information stored in the storage unit 110 to adjust the clock of the communication device 10. For example, the time or clock rate of the clock 111 is adjusted (step S505).

Figure 6:
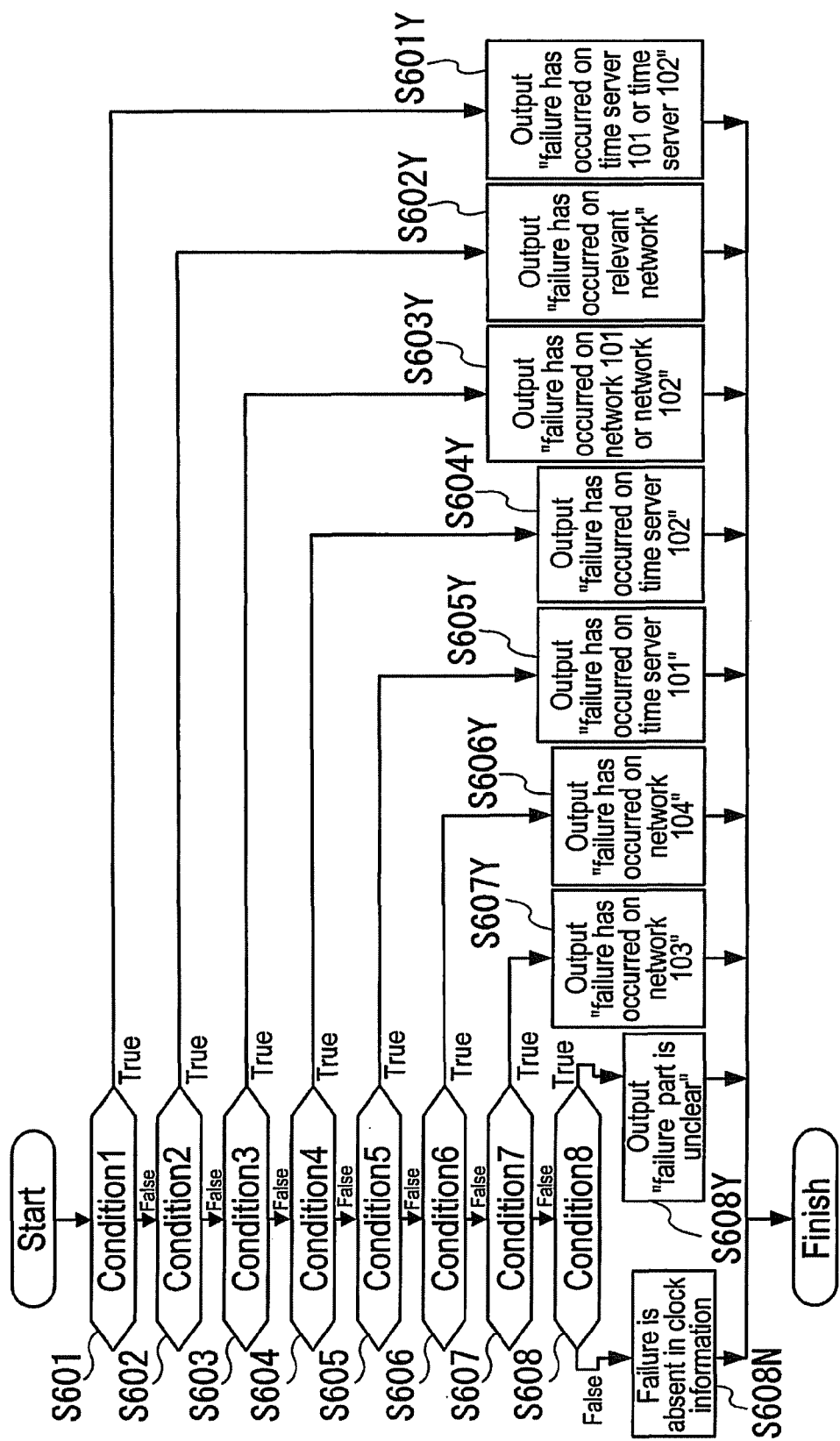
FIG. 6 is a flowchart illustrating an example of a processing flow of failure detection processing of the clock information performed by the communication device according to the first embodiment.

The following describes the failure detection of the clock information with reference to FIGS. 6 and 7. FIG. 6 is a flowchart illustrating a processing flow of detecting the failure of the clock information. Each of branch conditions in FIG. 6 is exclusive, so that the order of the processing flow is not limited to that of FIG. 6.

FIG. 7 is a table representing the branch conditions 1 to 8 of the failure detection described in FIG. 6. In FIG. 7, the clock information described in the form of "clock information (server A, network B)" indicates clock information measured on server A over network B. For example, in the case where the clock information indicates the clock rate, the clock information (time server 101, network 103) indicates a clock rate measured using the time server 101 and network 103. The clock information described in the form of "clock information (*, network 103)" indicates clock information measured using the time server 101 and network 103 and clock information measured using the time server 102 and network 103. The clock information described in the form of "clock information (time server 101, *)" indicates clock information measured using the time server 101 and network 103 and clock information measured using the time server 101 and network 104. And the clock information described in the form of "clock information (*,*)" indicates all clock information on all pairs of server and network.

The time synchronization unit 109 determines whether condition 1 of FIG. 7 is satisfied (step S601). As illustrated in FIG. 7, condition 1 indicates a case where a difference between the clock information (time server 101, network 103) and clock information (time server 101, network 104) stored in the storage unit 110 is small, where a difference between the clock information (time server 102, network 103) and clock information (time server 102, network 104) is small, and where a difference between the clock information (time server 101, *) and clock information (time server 102, *) is large. When it is determined that this condition is satisfied (true), the time synchronization unit 109 determines that the failure has occurred on "time server 101 or time server 102" and outputs corresponding information (Step S601Y). Thereafter, the time synchronization unit 109 ends the failure detection of the clock information.

The above condition "difference in the clock information is large" or "difference in the clock information is small" means, when the clock information indicates the time error, that the error is larger or smaller than a given set value, e.g., 1 μs. When the clock information indicates the clock skew, the above condition means that the error in the time progress is larger or smaller than a given set value, e.g., 1 μs per second.

On the other hand, when it is determined that the condition of step S601 is not satisfied (false), the time synchronization unit 109 determines whether condition 2 of FIG. 7 is satisfied or not (step S602). Condition 2 indicates a case where a value of the clock information of only one given pair of network and time server is far different from values of the clock information of other pairs. When it is determined that condition 2 is satisfied, the time synchronization unit 109 determines that the failure has occurred on "relevant network" and outputs corresponding information (step S602Y). Thereafter, the time synchronization unit 109 ends the failure detection of the clock information.

On the other hand, when it is determined that the condition of step S602 is not satisfied (false), the time synchronization unit 109 determines whether condition 3 of FIG. 7 is satisfied (step S603). Condition 3 indicates a case where a difference between the clock information (time server 101, network 103) and clock information (time server 102, network 103) is small, where a difference between the clock information (time server 101, network 104) and clock information (time server 102, network 104) is small, and where a difference between the clock information (*, network 103) and clock information (*, network 104) is large. When it is determined that condition 3 is satisfied, the time synchronization unit 109 determines that the failure has occurred on "network 101 or network 102" and outputs corresponding information (step S603Y). Thereafter, the time synchronization unit 109 ends the failure detection of the clock information.

On the other hand, when it is determined that the condition of step S603 is not satisfied (false), the time synchronization unit 109 determines whether condition 4 of FIG. 7 is satisfied (step S604). Condition 4 indicates a case where a difference between the clock information (time server 101, network 103) and clock information (time server 101, network 104) is small, where a difference between the clock information (time server 102, network 103) and clock information (time server 102, network 104) is large, and where a difference between the clock information (time server 101, *) and clock information (time server 102, *) is large. When it is determined that condition 4 is satisfied, the time synchronization unit 109 determines that the failure has occurred on "time server 102" and outputs corresponding information (step S604Y). Thereafter, the time synchronization unit 109 ends the failure detection of the clock information.

On the other hand, when it is determined that the condition of step S604 is not satisfied (false), the time synchronization unit 109 determines whether condition 5 of FIG. 7 is satisfied (step S605). Condition 5 indicates a case where a difference between the clock information (time server 101, network 103) and clock information (time server 101, network 104) is large, where a difference between the clock information (time server 102, network 103) and clock information (time server 102, network 104) is small, and where a difference between the clock information (time server 101, *) and clock information (time server 102, *) is large. When it is determined that condition 5 is satisfied, the time synchronization unit 109 determines that the failure has occurred on "time server 101" and outputs corresponding information (step S605Y). Thereafter, the time synchronization unit 109 ends the failure detection of the clock information.

On the other hand, when it is determined that the condition of step S605 is not satisfied (false), the time synchronization unit 109 determines whether condition 6 of FIG. 7 is satisfied (step S606). Condition 6 indicates a case where a difference between the clock information (time server 101, network 103) and clock information (time server 102, network 103) is small, where a difference between the clock information (time server 101, network 104) and clock information (time server 102, network 104) is large, and where a difference between the clock information (*, network 104) and clock information (*, network 103) is large. When it is determined that condition 6 is satisfied, the time synchronization unit 109 determines that the failure has occurred on "network 104" and outputs corresponding information (step S606Y). Thereafter, the time synchronization unit 109 ends the failure detection of the clock information.

On the other hand, when it is determined that the condition of step S606 is not satisfied (false), the time synchronization unit 109 determines whether condition 7 of FIG. 7 is satisfied (step S607). Condition 7 indicates a case where a difference between the clock information (time server 101, network 103) and clock information (time server 102, network 103) is large, where a difference between the clock information (time server 101, network 104) and clock information (time server 102, network 104) is small, and where a difference between the clock information (*, network 104) and clock information (*, network 103) is large. When it is determined that condition 7 is satisfied, the time synchronization unit 109 determines that the failure has occurred on "network 103" and outputs corresponding information (step S607Y). Thereafter, the time synchronization unit 109 ends the failure detection of the clock information.

On the other hand, when it is determined that the condition of step S607 is not satisfied (false), that is, when none of conditions 1 to 7 are satisfied, the time synchronization unit 109 determines whether condition 8 of FIG. 7 is satisfied (step S608). Condition 8 indicates a case where none of conditions 1 to 7 are satisfied and where a difference in the clock information is large between two sets of the pair of time server and network. When it is determined that condition 8 is satisfied, the time synchronization unit 109 determines that "abnormal part is unclear" (step S608Y). Thereafter, the time synchronization unit 109 ends the failure detection of the clock information. When it is determined that the condition of S608 is not satisfied, the time synchronization unit 109 determines that "failure of the clock information is absent" (step S608N). Thereafter, the time synchronization unit 109 ends the failure detection of the clock information.

The following describes the processing to detect the disconnected part with reference to FIGS. 4 and 8. In the following description, the time server and network from/over which the Announce message cannot be received are referred to as "time server A" and "network A", respectively. The time server and network different from the "time server A" and "network A" are referred to as "time server B" and "network B", respectively.

The time synchronization unit 109 of the communication device 10 determines, when the network processing unit 108 does not receive the Announce message from the time server A over the network A within a given set time, that communication with/over the time server A and network A is not possible, updates the clock information, and stores the updated clock information in the storage unit 110 (step S801). Specifically, "false" is set to the field "communication possibility" included in the clock information corresponding to time server A-network A pair.

Then, the time synchronization unit 109 selects any other pair of the server and network other than the pair of time server A and network A. And the time synchronization unit 109 checks communication possibility with the time server A and time server B using the selected pair (step S802).

For example, when checking the communication possibility with the time server 102 over the network 104, the time synchronization unit 109 makes the network processing unit 108 transmit an ICMP Echo Request to the time server 102 from the interface 106 over the network 104. When an ICMP Echo Reply (reply message) is received by the interface 106 from the time server 102 over the network 104 within a given set time, the time synchronization unit 109 acquires data indicating reception of the ICMP Echo Reply from the network processing unit 108 and sets "true" to the field "communication possibility" included in the clock information corresponding to time server 102-network 106 pair stored in the storage unit 110. On the other hand, when the ICMP Echo Reply is not received from the time server 102 within the set time, the time synchronization unit 109 sets "false" to the field "communication possibility" included in the clock information corresponding to time server 102-network 104 pair stored in the storage unit 110.

In place of the ICMP Echo Request, ICMP Echo Reply, a Management message of IEEE1588-2008 or a message of IEEE802.3ah or IEEE802.1ag may be used.

The time synchronization unit 109 then specifies the disconnected part (step S803). Details of the processing to specify the disconnected part will be described later. After specifying the disconnected part, the time synchronization unit 109 generates the error message describing the disconnected part, and the network processing unit 108 performs the Ethernet® protocol processing for the error message and notifies the remote device 107 of the resultant error message (step S804). The remote device 107 then notifies the administrator of the communication system of the failure.

Figure 9:
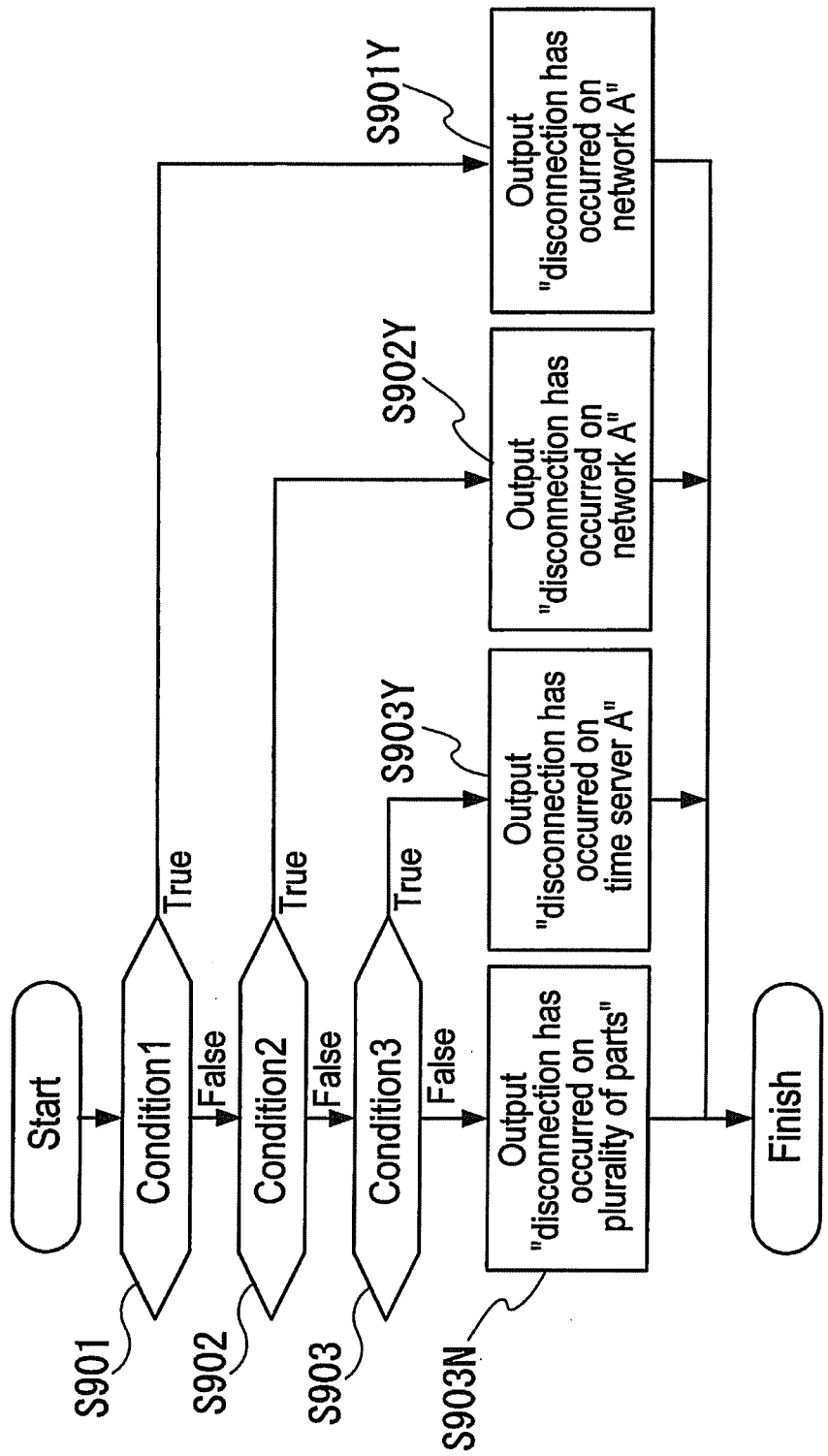
FIG. 9 is a flowchart illustrating a processing flow of communication disabled part specifying processing performed by the communication device according to the first embodiment.

The following describes the processing to specify the disconnected part in detail with reference to FIGS. 9 and 10.

FIG. 9 is a flowchart illustrating a processing to specify the disconnected part. FIG. 10 is a table representing branch conditions 1 to 3 described in FIG. 9. In FIG. 10, the communication possibility described in the form of "communication possibility (time server A, network A)" indicates whether the communication device 10 can communicate with the time server A over the network A or not. The communication possibility described in the form of "communication possibility (*, network A)" indicates whether the communication device 10 can communicate with both of the timeservers over the network A. And communication possibility described in the form of "communication possibility (time server A, *)" indicates whether the communication device 10 can communicate with the time server A (irrespective of whichever network is used).

The communication device 10 determines whether condition 1 of FIG. 10 is satisfied (step S901). As illustrated in FIG. 10, condition 1 indicates a case where only the communication possibility (time server A, network A) stored in the storage unit 110 is false. When it is determined that this condition is satisfied (true), the time synchronization unit 109 determines that the disconnected part is "part of communication path in network A not shared between time server 101 and time server 102" and outputs corresponding information (step S901Y). Thereafter, the time synchronization unit 109 ends the processing to specifythe disconnected.

On the other hand, when it is determined that the condition of step S901 is not satisfied (false), the time synchronization unit 109 determines whether condition 2 of FIG. 10 is satisfied (step S902). As illustrated in FIG. 10, condition 2 indicates a case where only the communication possibility (*, network A) is false. When it is determined that this condition is satisfied (true), the time synchronization unit 109 determines that the disconnected part is "part of communication path in network A shared between time server 101 and time server 102" and outputs corresponding information (step S902Y). Thereafter, the time synchronization unit 109 ends the processing to specify the disconnected part.

On the other hand, when it is determined that the condition of step S902 is not satisfied (false), the time synchronization unit 109 determines whether condition 3 of FIG. 10 is satisfied (step S903). As illustrated in FIG. 10, condition 3 indicates a case where only the communication possibility (time server A, *) is false. When it is determined that this condition is satisfied (true), the time synchronization unit 109 determines that the disconnected part is "time server A" and outputs corresponding information (step S903Y). Thereafter, the time synchronization unit 109 ends the processing to specify the disconnected part. On the other hand, when it is determined that the condition of S903 is not satisfied (false), the time synchronization unit 109 determines that a plurality of disconnected parts exist and outputs corresponding information (step S903N). Thereafter, the time synchronization unit 109 ends the processing to specify the disconnected part.

The above-described communication system of the first embodiment may be any type of communication system as long as it includes a plurality of communication paths over which the communication device 10 communicates with a plurality of time servers and any modifications may be made thereto. For example, the present embodiment may be applied to a configuration in which the communication device 10 communicates with the time server 101 and time server 102 over two or more networks. Alternatively, the present embodiment may be applied to a configuration in which the communication device 10 communicates with three or more time servers including the time server 101 and time server 102. The communication device 10, time server 101, time server 102, and remote device 107 may be connected in a ring topology. Further, it is possible to construct a network in which the communication path is made redundant by transmitting/receiving frames each including the same data using two interfaces. Further, another network redundancy technology may be used.

The communication device 10 can be realized by using, e.g., a general-purpose computer as basic hardware. That is, the interface 105, interface 106, network processing unit 108, time synchronization unit 109, storage unit 110, and clock 111 can be realized by a processor mounted on the computer executing a program. In this case, a time server may be realized by previously installing the program in the computer or realized by distributing the program through a storage medium such as a CD-ROM onto which the program is stored or through a network and installing the program in the computer according to the need. The storage unit 110 can be realized by using, according to the need, a memory incorporated in or externally connected to the computer, a hard disk, or a storage medium such as a CD-R, a CD-RW, a DVD-RAM, or DVD-R.

According to the present embodiment, the communication device 10 can easily specify a location of the failure that has occurred in any of the time server and network, in a network in which the time server and communication path are made redundant.

Second Embodiment

The following describes a communication system according to a second embodiment. The communication system according to the second embodiment detects presence/absence of the failure of the communication device. More specifically, the communication device externally acquires a value changing from moment to moment with time, generates a message (hereinafter, referred to as "test message") including the value and transmits the test message to the remote device. The remote device compares measurement values described in the test messages received from a plurality of communication devices to determine the presence/absence of a failure in the plurality of communication devices. This allows more correct specification of the failurepart.

Figure 11:
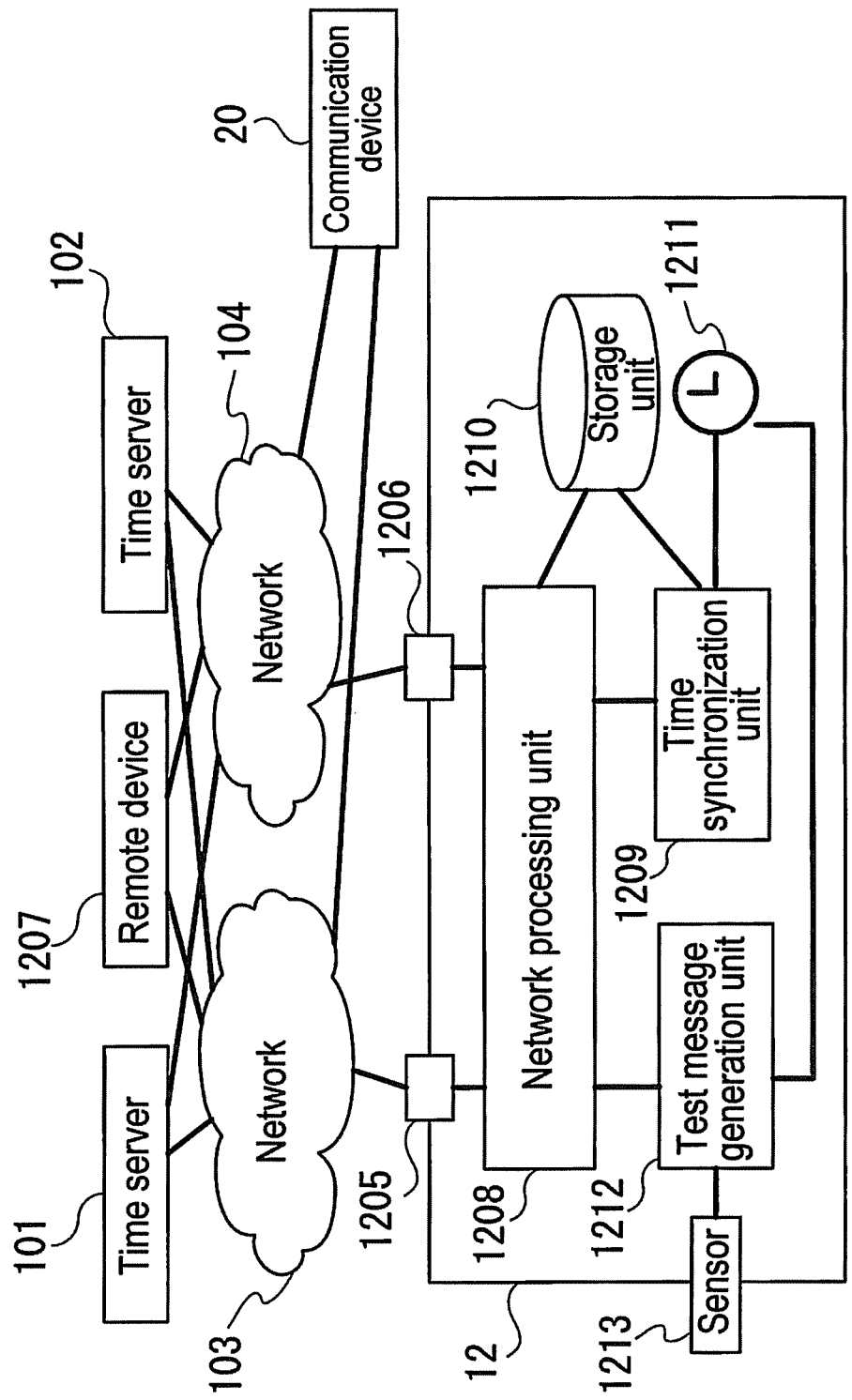
FIG. 11 is a view illustrating configurations of a communication device and a communication system according to a second embodiment.

FIG. 11 is a view illustrating a configuration of the communication system according to the second embodiment. The communication system roughly includes communication devices 12, 20, two time servers 101, 102, two networks 103, 104, and a remote device 1207. The communication device 12 includes, as components for transmitting/receiving signals with external devices, two interfaces 1205, 1206, a network processing unit 1208, a time synchronization unit 1209, a storage unit 1210, a clock 1211, a test message generation unit 1212, and a sensor 1213. The communication device 20 has the same configuration as that of the communication device 12.

The sensor 1213 is a sensor for measuring an amount (hereinafter, referred to as "measurement value") changing from moment to moment with time. For example, the sensor 1213 measures a current value or a voltage value of a current flowing in an electric wire in a substation. The sensor 1213 may be a sensor for measuring temperature, humidity, density of a specific gas, water flow rate, water pressure, or light amount.

The test message generation unit 1212 generates the test message describing the measurement value obtained by the sensor 1213 and measurement time thereof.

The network processing unit 1208 has the same function as that of the network processing unit 108 of FIG. 1, as well as a function of performing protocol processing to the test message generated in the test message generation unit 1212 and transmitting the resultant test message to the remote device 1207 through the interface 1205 or interface 1206.

The remote device 1207 compares the measurement values described in the test messages received from the communication device 12 and communication device 20 to determine whether a time error has occurred in the communication device 12 or communication device 20.

Figure 12:
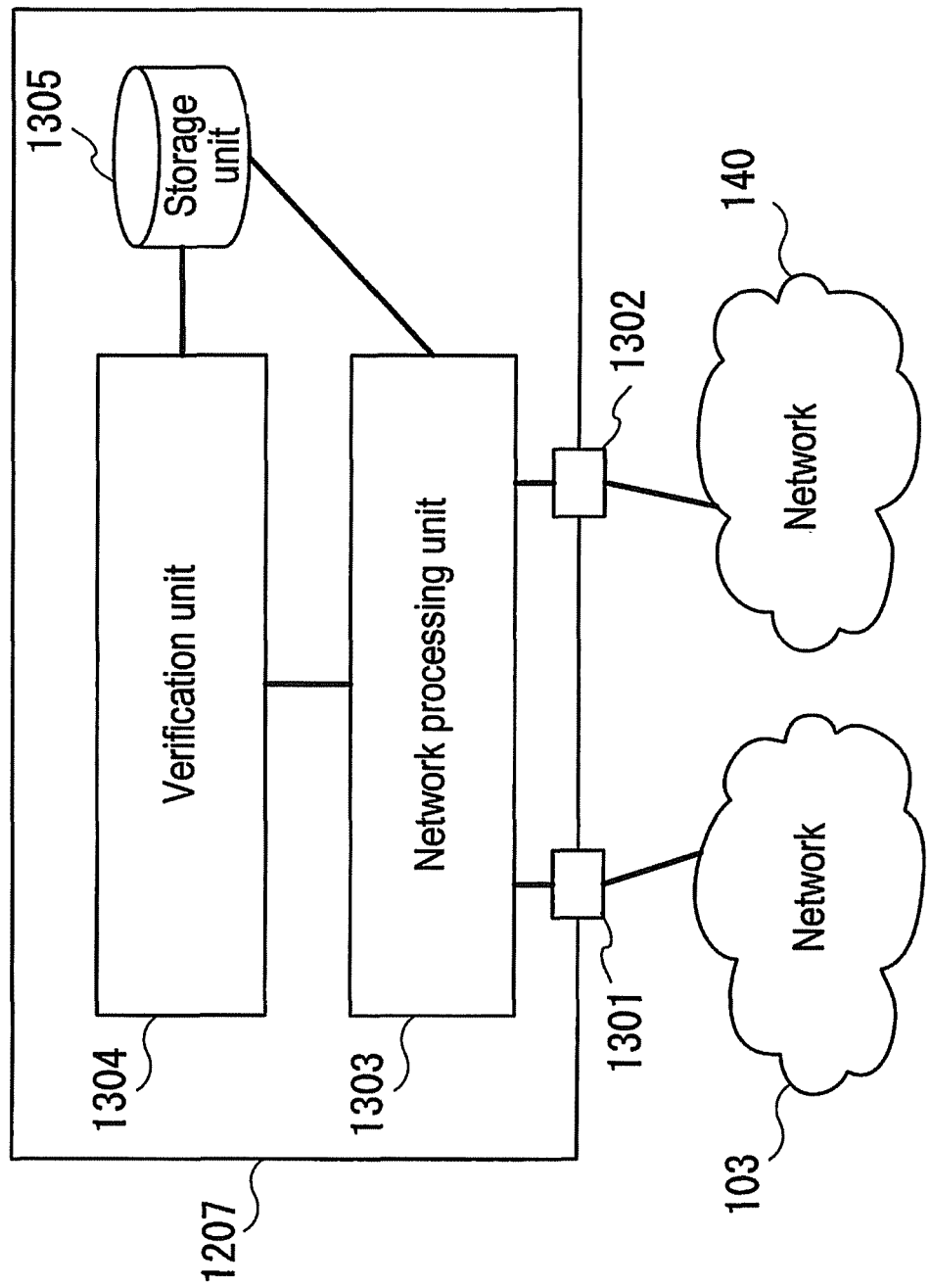
FIG. 12 is a block diagram illustrating a remote device according to the second embodiment.

FIG. 12 is a block diagram illustrating a configuration of the remote device 1207. The remote device 1207 includes an interface 1301, an interface 1302, a network processing unit 1303, a verification unit 1304, and a storage unit 1305.

The interfaces 1301 and 1302 are each a communication interface supporting communication schemes such as Ethernet®, power line protocol, Zigbee, CDMA, WiMAX, LTE (Long Term Evolution), and CAN (Controller Area Network).

The network processing unit 1303 performs processing based on a protocol such as Ethernet®, IPv4, IPv6, Profinet®, or CAN. Further, the network processing unit 1303 receives the test message through the interface 1301 or interface 1302.

The verification unit 1304 compares the measurement values described in the test messages received from the communication device 12 and communication device 20 to determine the presence/absence of a time error in the communication device 12 or communication device 20. Further, the verification unit 1304 notifies, when detecting the time error in the communication device 12 or communication device 20, the administrator of the communication device of the detected time error.

The storage unit 1305 holds the measurement value described in the test message received by the network processing unit 1303.

FIG. 13 is a table representing an example of the measurement data stored in the storage unit 1305 (hereinafter, referred to merely as "measurement data"). One measurement data includes identifier of the communication device to be measured, network over which the test message is transmitted, measurement time, and measurement value.

Figure 14:
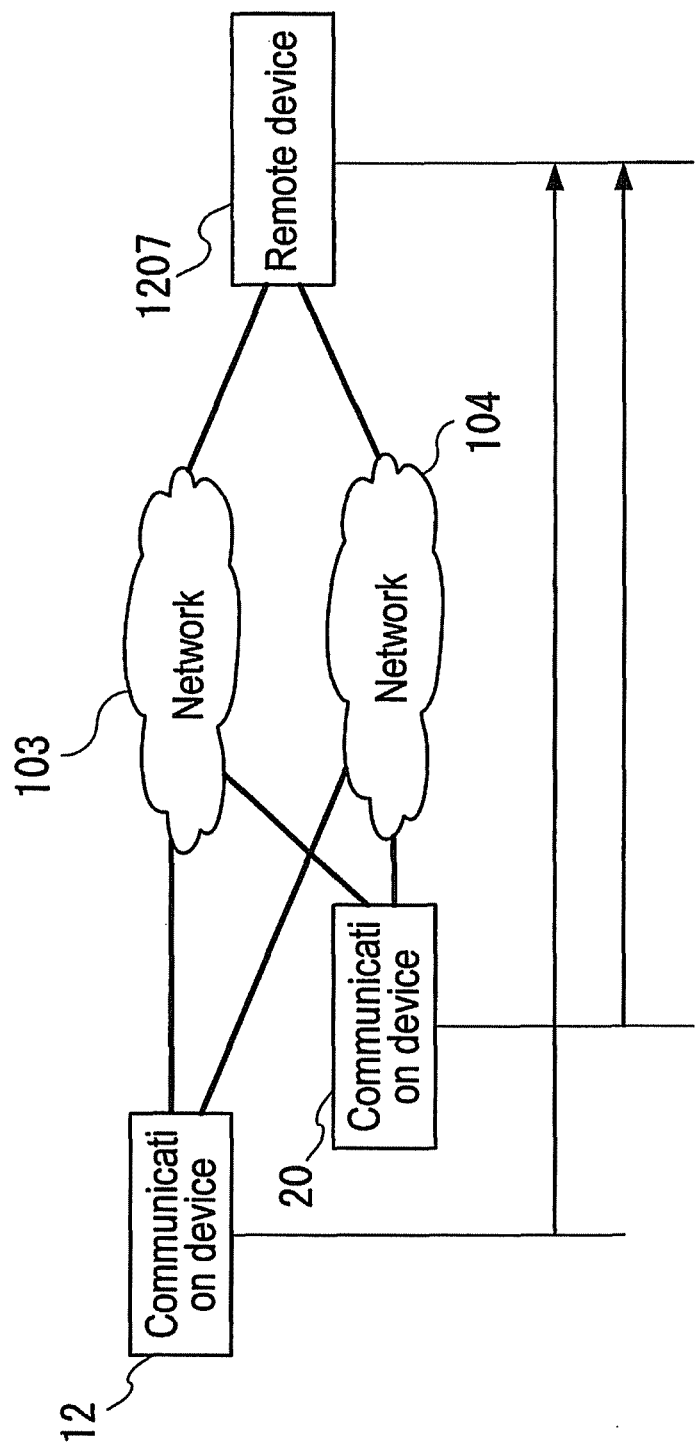
FIG. 14 is a sequence diagram illustrating an operation of the communication system according to the second embodiment.

The following describes an operation of the communication system according to the second embodiment. FIG. 14 is a sequence diagram illustrating the time synchronization operation in the communication system. The message sequence for the time synchronization among the communication device 12, communication device 20, time server 101, and time server 102 is equivalent to that of the first embodiment and is thus omitted in FIG. 14.

Figure 15:
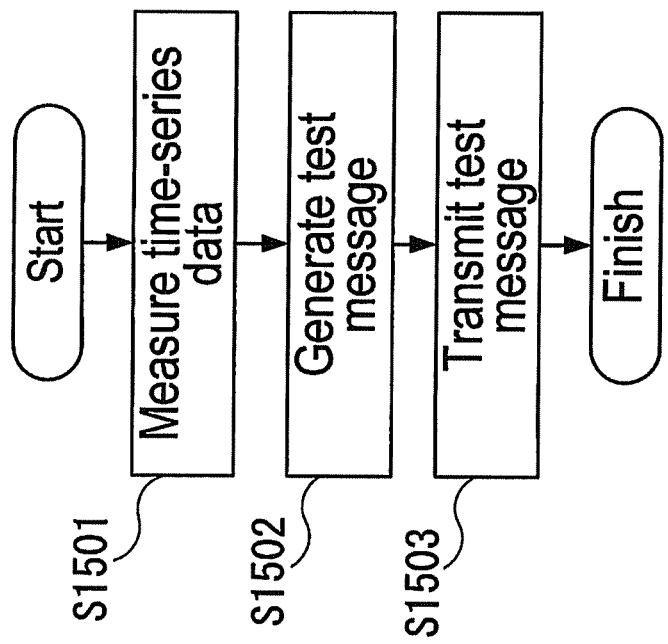
FIG. 15 is a flowchart illustrating an operation of the communication device according to the second embodiment.

FIG. 15 is a flowchart illustrating an operation of each of the communication device 12 and communication device 20 in the communication system.

When the clock 1211 of the communication device 12 reaches a preset time, the sensor 1213 measures time-series data (step S1501).

Then, the test message generation unit 1212 generates the test message describing the measurement value obtained by the sensor 1213, measurement time, identifier of the communication device 12, and the like (step S1502).

The identifier of the communication device 12 is a value for distinguishing between the communication device 12 and communication device 20. The identifier is, e.g., a numeric value or a character string. Alternatively, the identifier may be Clock Identity of IEEE1588.

The network processing unit 1208 performs the protocol processing for the test message generated by the test message generation unit and transmits the resultant test message to the remote device 1207 from the interface 1205 over the network 103 (step S1503).

Similarly, the communication device 20 measures, when a clock (not illustrated) thereof reaches a present time, the time-series data and transmits the test message to the remote device 1207 over the network 104.

A configuration may be adopted in which the same time is set for the communication device 12 and communication device 20 and the test message is periodically transmitted at the set time. The communication device 12 and communication device 20 each may transmit the test message over either the network 103 or network 104.

Figure 16:
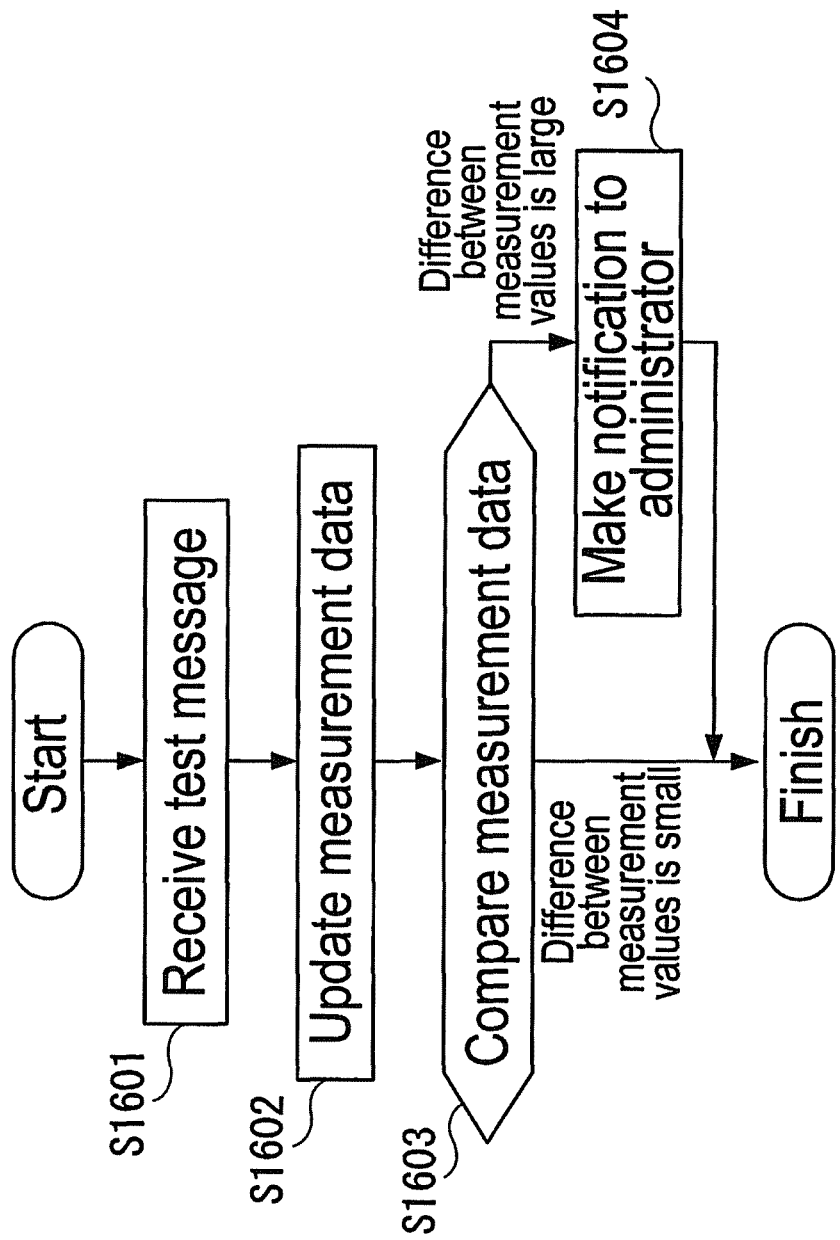
FIG. 16 is a flowchart illustrating an operation of the remote device according to the second embodiment.

The following describes an operation of the remote device 1207. FIG. 16 is a flowchart illustrating an operation of test message reception processing performed in the remote device 1207.

The network processing unit 1303 of the remote device 1207 receives the test messages from the communication devices 12 and 20 through the interfaces 1301 or interface 1302 (step S1601).

Subsequently, the network processing unit 1303 stores as one measurement data the measurement time, measurement value, and identifier of the communication device which are described in the test message and network over which the test message has transmitted in the storage unit 1305 (step S1602).

The verification unit 1304 acquires from the storage unit 1305 the measurement value of the identifier indicating the communication device 12 and measurement value of the identifier indicating the communication device 20 which are obtained at the same measurement time and compares the acquired measurement values (step S1603).

When a difference between the two measurement values is large, the verification unit 1304 determines that the time error between the communication device 12 and communication device 20 is large. The verification unit 1304 notifies the administrator of presence of a failure in the communication device 12 or communication device 20 (step S1604) and ends this routine. On the other hand, when the difference between the two measurement values is small, the verification unit 1304 determines that the time error between the communication device 12 and communication device 20 is small and ends this routine.

Any method can be used to make the notification to the administrator. For example, the remote device 1207 may make the notification to a remotely located device over a network different from the network 101 and network 102. Alternatively, the remote device 1207 may include a display unit such as a display or lamp in addition to the configuration illustrated in FIG. 12 so as to display information concerning the failure.

According to the communication system of the present embodiment, it is possible to detect without fail in which one of the plurality of communication devices constituting the communication system the failure has occurred.

While certain embodiments have been described, these embodiments have been presented using example only, and are not intended to limit the scope of the inventions. Indeed, the novel methods and systems described herein may be embodied in a variety of the other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A communication device comprising:
a plurality of interfaces connecting to a plurality of time servers and a remote device over a plurality of networks as communication paths;
a time synchronization unit that specifies a failure part on the network and generates error message describing a range within which a failure has occurred; and
a network processing unit that performs protocol processing between itself and time server through the interface so as to transmit/receive a communication message, performs protocol processing for the error message generated in the time synchronization unit and transmits the resultant message to the remote device,
the time synchronization unit calculating, for each combination of the time server and communication paths, clock information based on information described in the communication message and reception time thereof and specifying the failure part on the network based on the calculated clock information;

wherein in the case where a difference between first clock information calculated using the communication message received from a first time server over a first network and second clock information calculated using the communication message received from the first time server over a second network is smaller than a set value, where a second difference between third clock information calculated using the communication message received from a second time server over the first network and fourth clock information calculated using the communication message received from the second time server over the second network is smaller than the set value, and where a third difference between the first clock information or second clock information and third clock information or fourth clock information is larger than the set value, the time synchronization unit determines that the failure has occurred in the first time server or second time server.

2. The communication device according to claim 1, wherein in the case where a fourth difference between the first clock information and third clock information is smaller than the set value, where a fifth difference between the second clock information and fourth clock information is smaller than the set value, and where a sixth difference between the first clock information or third clock information and second clock information or fourth clock information is larger than the set value, the time synchronization unit determines that the failure has occurred in the first network or second network.

3. The communication device according to claim 2, further comprising a storage unit that stores information indicating whether the communication message transmitted from the first time server over the first network has been accepted or rejected within a preset time, information indicating whether the communication message transmitted from the first time server over the second network has been accepted or rejected within a second preset time, and information indicating whether the communication message transmitted from the second time server, over the first network has been accepted or rejected within a third preset time, and information indicating whether the communication message transmitted from the second time server over the second network has been accepted or rejected within a fourth preset time, and
the time synchronization unit specifies the failure part based on the combination of the information indicating the acceptance/rejection of communication stored in the storage unit.

4. The communication device according to claim 3, wherein when only the communication message transmitted from the first time server over the first network has not been received within the preset time as to the information indicating the acceptance/rejection of communication stored in the storage unit, the time synchronization unit determines that the failure has occurred in a part of the communication path in the first network not shared between the first time server and second timeserver.

5. The communication device according to claim 4, wherein when only the communication message transmitted over the first network has not been received within the preset time as to the information indicating the acceptance/rejection of communication stored in the storage unit, the time synchronization unit determines that the failure has occurred in said part of the communication path in the first network shared between the first time server and second time server.

6. The communication device according to claim 5, wherein, when only the communication message transmitted from the first time server has not been received within the preset time as to the information indicating the acceptance/rejection of communication stored in the storage unit, the time synchronization unit determines that the failure has occurred in the first time server.

7. The communication device according to claim 6, wherein the clock information is a time error or a clock skew between the communication device and time server.

8. The communication device of claim 7, further including a sensor that measures an amount changing from moment to moment; and a test message generation unit that generates a test message including a measurement value of time-series data obtained by the sensor and measurement time thereof, the network processing unit performing protocol processing for the test message and transmitting a resultant test message to the remote device;
a plurality of interfaces connecting to a plurality of communication devices over the plurality of networks; and
said remote device, including a verification unit that performs verification of the plurality of communication devices, determining in which one of the plurality of communication devices the failure has occurred, the determining from comparing measurement values included in a plurality of test messages received through the interfaces.

* * * * *